(12) United States Patent
Enzaki et al.

(10) Patent No.: US 6,772,989 B2
(45) Date of Patent: Aug. 10, 2004

(54) MAINTENANCE-EASY TWO-PORT VALVE

(75) Inventors: Akira Enzaki, Tsukuba-gun (JP);
Toyonobu Sakurai, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 134 days.

(21) Appl. No.: 10/244,680

(22) Filed: Sep. 17, 2002

(65) Prior Publication Data

US 2003/0052293 A1 Mar. 20, 2003

(30) Foreign Application Priority Data

Sep. 18, 2001 (JP) ........................................ 2001-283836

(51) Int. Cl.[7] ..................... F16K 31/143; F16K 31/163; F16K 31/363; F16K 31/383
(52) U.S. Cl. ........................................ 251/63.5; 92/128
(58) Field of Search .......................... 251/63.5; 92/128, 92/169.1, 171.1

(56) References Cited

U.S. PATENT DOCUMENTS

| | | | |
|---|---|---|---|
| 612,695 A | * 10/1898 | Backman | ..................... 91/467 |
| 4,725,029 A | * 2/1988 | Herve | ..................... 248/221.12 |
| 5,915,410 A | * 6/1999 | Zajac | ......................... 137/341 |

* cited by examiner

Primary Examiner—Edward K. Look
Assistant Examiner—John K. Fristoe, Jr.
(74) Attorney, Agent, or Firm—Oblon, Spivak, McClelland, Maier & Neustadt, P.C.

(57) ABSTRACT

To provide a maintenance-easy two-port valve capable of easily assembling and disassembling a valve body and a bonnet, and preventing the bonnet from being detached from the valve body by an erroneous operation. In a two-port valve 1 having attachment means for detachably attaching a bonnet 21 to a valve body 2, the attachment means includes a plurality of shafts 16 fixedly attached to a valve body 2 and each having an engagement groove 17 on an upper end portion, a handle 31, a plate 41 rotatably provided between an upper end portion of the bonnet 21 and the handle 31 and having an engagement groove 43 engaged to or disengaged from the retaining groove 17 by rotating the plate 41, and an engagement pin 35 engaged with an engagement hole 44 provided in the plate 41 at a push-down position of the handle 31, transmitting the rotation of the handle 31 to the plate 41 and fixedly attached to the handle 31.

5 Claims, 10 Drawing Sheets

MAINTENANCE-EASY TWO-PORT VALVE

TECHNICAL FIELD

The present invention relates to a two-port valve which can be easily maintained and is used as a high vacuum L valve or the like.

PRIOR ART

As shown in FIG. 18, a two-port valve used as the high vacuum L valve or the like is conventionally well known.

The well-known two-port valve has a valve body 111 which includes ports 112 and 113 formed in an orthogonal direction, a valve seat 114 provided in a flow path connecting these ports 112 and 113 to each other, and an open end 115 facing the valve seat 114. A cylinder 120 of a pneumatic cylinder system 119 which drives a valve element 123 is formed in a bonnet 117 which is airtight attached to the open end 115 through a bellows plate 116.

A valve rod 124 of the valve element 123 which opens and closes the valve seat 114 airtight penetrates the bonnet 117 and is connected to a piston 121 of the pneumatic cylinder 119, and a return spring 125 is compressed between the valve element 123 and the bonnet 117. Further, the bonnet 117 is provided with a port 127 which supplies and discharges compressed air to and from a bellows plate 116-side pressure chamber 126 which is defined by the piston 121.

The both ends of a bellows 128 which surrounds the valve rod 124 are airtight, fixedly attached to the inner peripheral surface of the bellows plate 116 and to the valve element 123, and annular attachment grooves 130 for respectively attaching seal rings 131 are formed on the surface of the valve element 123 on which the valve element 123 faces the valve seat 114.

However, the well-known two-port valve has the following problem. It is necessary to detach the bonnet 117 from the valve body 111 so as to exchange the seal ring 131 of the valve element 123 or to wash the bellows 128 or the inner surface of the valve body 111. Since the bonnet 117 is fixedly attached to the valve body 111 by bolts (not shown), it is necessary to loosen the bolts to detach the bonnet from the valve body 111. However, since the bonnet 117 cannot be easily attached and detached to and from the valve body 111, it takes time to do maintenance.

DISCLOSURE OF THE INVENTION

The present invention has been made to solve such a problem and its technical object is to provide a two-port valve capable of easily dissembling and assembling a valve body and a bonnet and making maintenance easy.

It is another technical object of the present invention to provide a safe two-port valve capable of preventing a bonnet from being detached from a valve body by an erroneous operation while having a structure of enabling simple dissemble.

To solve the problem, a maintenance-easy two-port valve according to the present invention comprises: a valve body including two ports, a valve seat in a flow path connecting the two ports to each other, and an open end; a valve member opening and closing the valve; a bonnet airtight connected to the open end of the valve body, and containing a cylinder system driving the valve member; and a connection mechanism for detachably connecting the bonnet to the valve body, and is characterized in that the connection mechanism comprises: a plurality of shafts attached to the valve body, penetrating the bonnet in an axial direction, and each having a tip end protruding outward from an outer end face of the bonnet; a handle attached onto the outer end face of the bonnet to be rotatable around an axis and displaceable in the axial direction, and having one or a plurality of engagement pins on a surface facing the outer end face of the bonnet; a plate provided between the bonnet and the handle to be rotatable around the axis, and including a plurality of engagement grooves engaged with or disengaged from upper ends of the shafts, respectively, and one or a plurality of engagement holes into which or from which the one or plurality of engagement pins are fitted or disengaged, respectively; and a spring disposed between the handle and the plate, and urging the handle and the plate in a direction in which the handle and the plate are away from each other and a direction in which the handle and the plate are rotated relative to each other.

According to the present invention, the two-port valve is constituted so that the bonnet includes a lock pin engaged with and disengaged from the plate, and the lock pin is stopped at the plate to lock the plate to the bonnet if the plate is at a position at which the plate is engaged with the shafts and a position at which the plate is disengaged from the shafts, and the lock pin is detached from the plate to release locking of the plate to the bonnet while the plate is rotated from the position at which the plate is engaged with the shafts to the position at which the plate is disengaged from the shafts.

According to the present invention, the two-port valve is further constituted so that the handle includes a plurality of elliptic grooves, the upper ends of the shafts being displaceably fitted into the elliptic grooves, respectively, a push-down position of the handle is specified when an end wall on one longitudinal side of each of the elliptic grooves is abutted on each of the shafts, and a position at which the shafts are disengaged from the engagement grooves of the plate, respectively, is specified when an end wall on the other side of each of the elliptic grooves is abutted on each of the shafts, and constituted so that the plate includes one or a plurality of elliptic holes, a bolt fixed to the bonnet being displaceably fitted into each of the elliptic holes, a position at which the shafts are engaged with the engagement grooves of the plate, respectively is specified when an end wall on one longitudinal side of each of the elliptic holes is abutted on the bolt, and a position at which the shafts are disengaged from the engagement grooves of the plate, respectively is specified when an end wall on the other side of each of the elliptic holes is abutted on the bolt.

According to another aspect of the present invention, the cylinder system includes a piston actuated by a function of fluid pressure; and a valve rod penetrating the bonnet to extend into the valve body, and connecting the piston to the valve member, and a return spring urging the valve member in a valve opening direction and a bellows surrounding the valve rod and the return spring are provided between the bonnet and the valve member.

Furthermore, according to the present invention, the two-port valve is constituted so that a counter rotation prevention pin is provided at the handle, a hole, into which the counter rotation prevention pin is displaceable fitted, is provided in the plate, and so that the counter rotation prevention pin is constituted to be stopped in the hole and to prevent the handle from being rotated in a counter direction when the bonnet is connected to the valve body.

According to the maintenance-easy two-port valve, even if the handle is to be pushed down at the rotation position other than the push-down rotation position, the push-down prevention pin is abutted on the plate and the handle cannot be, therefore, pushed down. However, if the handle is rotated to the push-down rotation position, the position of the push-down prevention pin coincides with the position of the engagement hole provided in the plate. It is, therefore, possible to push down the handle and to engage the push-down prevention pin with the engagement hole.

If the handle is rotated in this state, the plate can be rotated to the position at which the engagement groove thereof is detached from the retaining groove of each shaft since the plate is engaged with the handle by the push-down prevention pin. If the handle is lifted at this position, the bonnet connected to the handle can be detached from the valve body.

Furthermore, if the bonnet is inserted into the valve body and the handle is rotated to the push-down rotation position and pushed down, then the push-down prevention pin can be engaged with the engagement hole. If the handle is rotated in this state, the plate can be rotated to the position at which the engagement groove thereof is engaged with the retaining groove of each shaft. It is, therefore, possible to attach the bonnet to the valve body.

As can be seen, since the maintenance-easy two-port valve is constituted so that the bonnet can be attached to or detached from the valve body only by pushing down, rotating and lifting the handle, the valve body and the bonnet can be easily disassembled and assembled.

BRIEF DESCRIPTION OF THE INVENTION

DETAILED DESCRIPTION

FIGS. 1 to 17 show one embodiment of a maintenance-easy two-port valve according to the present invention.

Figure 1:
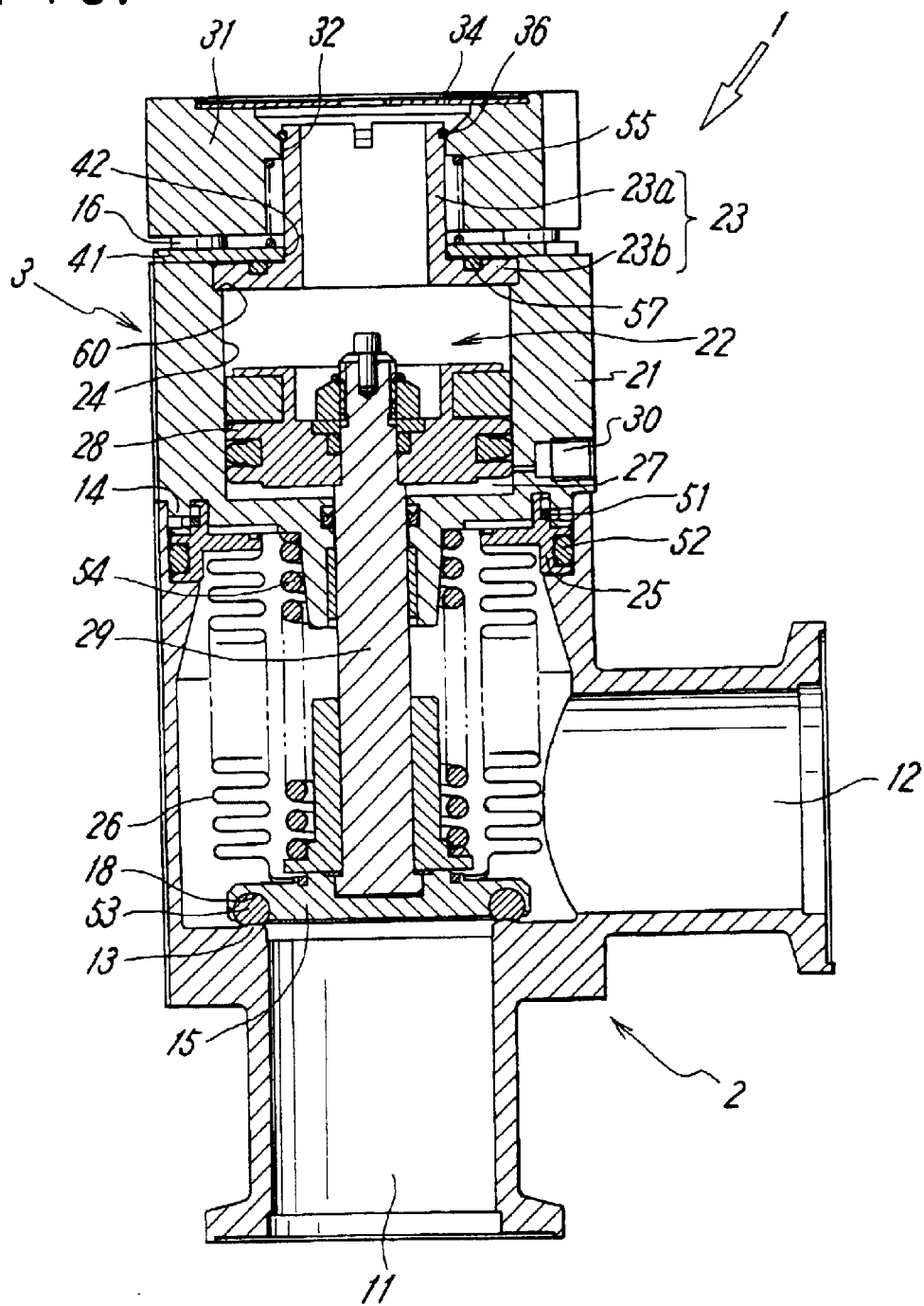
FIG. 1 is a longitudinal sectional view showing one embodiment of a maintenance-easy two-port valve according to the present invention.
Figure 2:
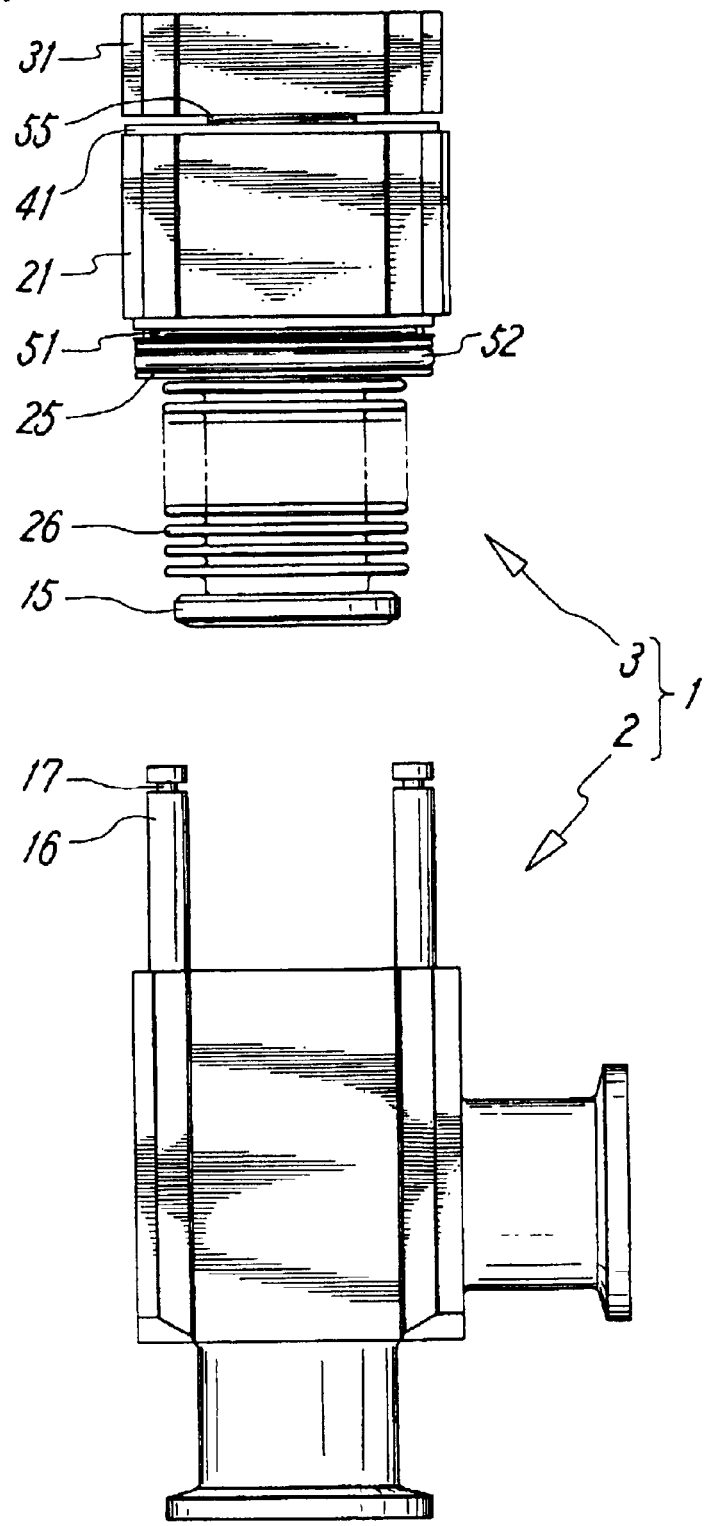
FIG. 2 shows a state in which a bonnet assembly is detached from the valve body of the maintenance-easy two-port valve.

As shown in FIG. 1, the maintenance-easy two-port valve 1 is comprised with two ports 11 and 12, a valve seat 13 which is provided in a flow path connecting the ports 11 and 12 to each other, a valve body 2 having an open end 14 at a position opposed to the valve seat 13, a bonnet 21 which airtight closes the open end 14, a valve member 15 which is driven by a pneumatic cylinder system 22 in the bonnet 21 to open and close the valve seat 13, and a connection mechanism for detachably connecting the bonnet 21 to the valve body 2.

Such parts as collar 23, a handle 31, a plate 41, a bellows holder 25 and a bellows 26 are assembled into the bonnet 21, and a bonnet assembly 3 is constituted out of the bonnet 21 and the respective parts assembled into the bonnet 21.

The connection mechanism includes four (or two) shafts 16 (see FIG. 2) which are fixed to the valve body 2, have retaining grooves 17 provided on upper end portions, respectively, and penetrate the bonnet 21 and protrude from the upper end portion of the bonnet 21, the handle 31 which is attached so as to be rotatable relative to the collar 23 attached to the upper end portion of the bonnet 21 and allow pushing-down operation at a push-down position to be described later, the plate 41 (see FIGS. 1, 4 and 8) which is provided so as to be rotatable between the upper end portion of the bonnet 21 and the handle 31 and which has an engagement groove 43 engaged with or disengaged from the retaining groove 17 of each shaft 16 according to rotation thereof, and engagement pins 35 (see FIG. 4) which are fixed to the handle 31 and which are engaged with the engagement holes 44 (see FIGS. 3, 4 and 8) of the plate 41 to transmit the rotational force of the handle 31 to the plate 41 when the handle 31 is at the push-down position.

The engagement pins 35 are fixed to the handle 31 by being press-fitted into circular holes 38 (see FIG. 4) formed in the handle 31, respectively.

As shown in FIG. 1, the collar 23 includes a hollow cylindrical guide section 23a which protrudes upward from the upper end portion of the bonnet 21 and a large-diameter flange section 23b which is fixed to the upper end portion of the bonnet 21 provided in the lower end of the guide section 23a. The guide section 23a fits the handle 31 and the plate 41 into through holes 32 and 42 provided in central portions thereof, respectively, thereby guiding the handle 31 and the plate 41.

A coil spring 55 (see FIGS. 1 and 9) which is located between the handle 31 and the plate 41 and urges the handle 31 and the plate 41 in a direction in which the handle 31 and the plate 41 are away from each other, is provided around the guide section 23a, and fixed rings 36 which suppress the movement of the handle 31 which is to be moved upward by the urging force of the coil spring 55, is detachably attached to the upper end portion of the guide section 23a.

The through hole 32 of the handle 31 serves as a space which diameter is enlarged in the lower portion and in which the coil spring 55 is stored. The upper portion of the through hole 32 is inclined to be open upward and the uppermost end of the through hole 32 is covered with a lid 34.

The coil spring 55 has one end portion 55a connected to the handle 31 and the other end portion 55b connected to the plate 41. The end portion 55b is inserted into a connection notch section 45 which is formed in the through hole 32 of the plate 41.

The coil spring 55 functions not only to urge the handle 31 and the plate 41 in an axial direction in which they are away from each other but also to accumulate an urging force in a rotation direction which is generated when the handle 31 is rotated relative to the plate 41. Due to this, if a push-down operation for pushing down the handle 41 is stopped, the accumulated axial urging force causes the handle 31 and the plate 41 to be away from each other to thereby disengage the engagement pins 35 on the handle 31 from the engagement holes 44 of the plate 41, respectively. In addition, the accumulated axial urging force causes the handle 31 or the plate 41 to be rotated in a relatively counter direction to thereby return the handle 31 or the plate 41 to its original rotation position.

A cylinder hole 24 of the pneumatic cylinder system 22 is formed in the bonnet 21, the valve rod 29 connected to the valve member 15 airtight penetrates the bonnet 21 and is connected to the piston 28 of the pneumatic cylinder system 22, and a return spring 54 is compressed between the valve member 15 and the bonnet 21. Further, the bonnet 21 is provided with a port 30 which supplies and discharges compressed air to and from a bellows 26-side pressure chamber 27 which is defined by the piston 28.

The bonnet 21 airtight closes the open end 14 of the valve body 2, the metal bellows holder 25 is detachably fixed to the lower end portion of this bonnet 21 through a ring 51, and the bellows holder 25 is contained in an annular stepped portion which is provided on the open end 14 of the valve body 2 through an O ring 52. The both ends of the metal bellows 26 which surrounds the valve rod 29 are airtight fixed to the inner peripheral surface of the bellows holder 25 and to the valve member 15 by welding or the like.

Figure 18:
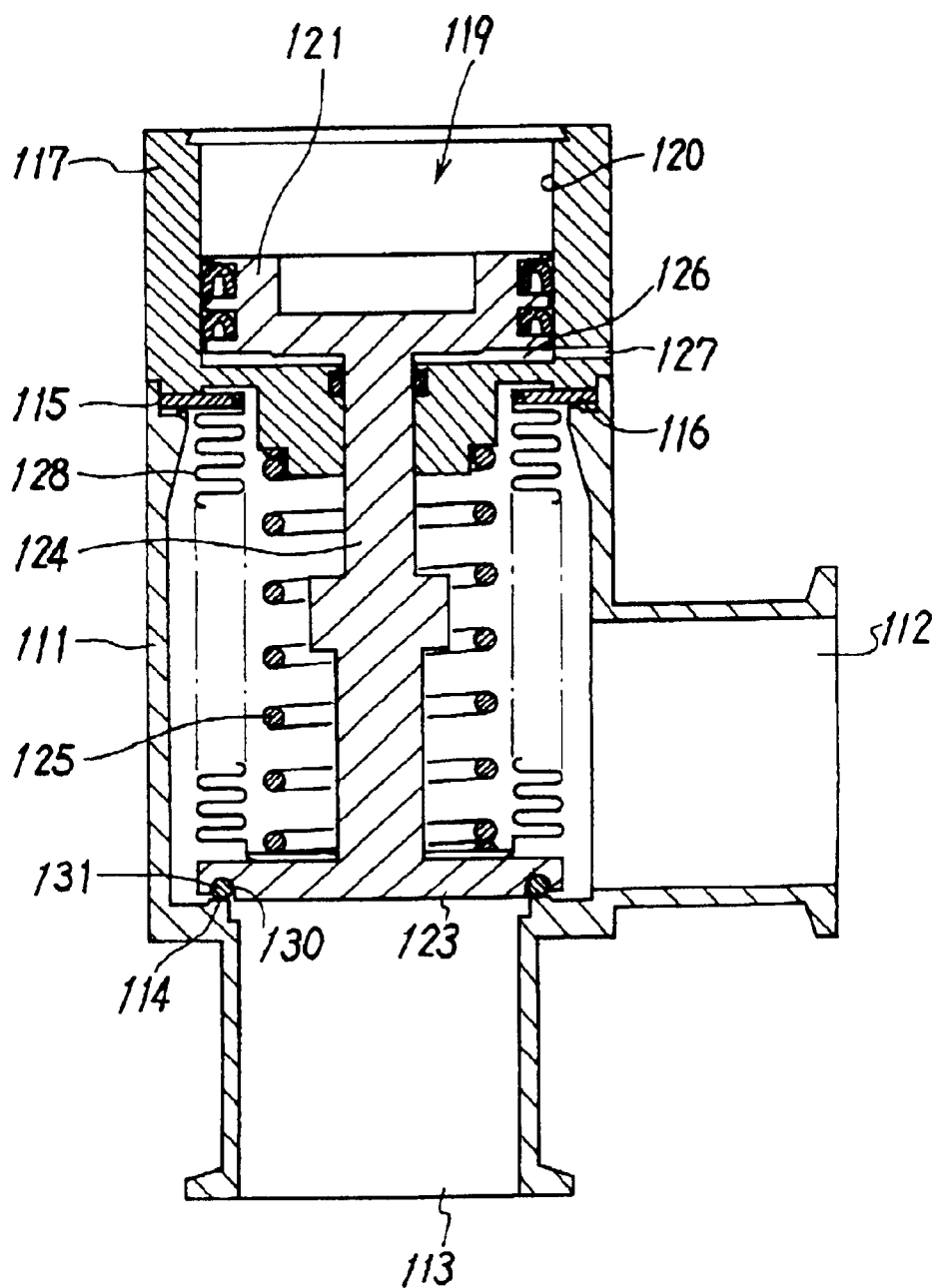
FIG. 18 is a longitudinal sectional view showing a conventionally well-known two-port valve.

The valve member 15 has annular attachment grooves 18 on the surface thereof which faces the valve seat 13, and the O rings 52 which seal the valve seat 13 are attached to the attachment grooves 18, respectively, while protruding a part of the O rings 53 from the respective attachment grooves 18. As shown in FIG. 18, the conventional valve seat is a flat surface which faces the O rings 14, whereas the valve seat 13 may be R-shaped as shown in FIG. 1.

Figure 3:
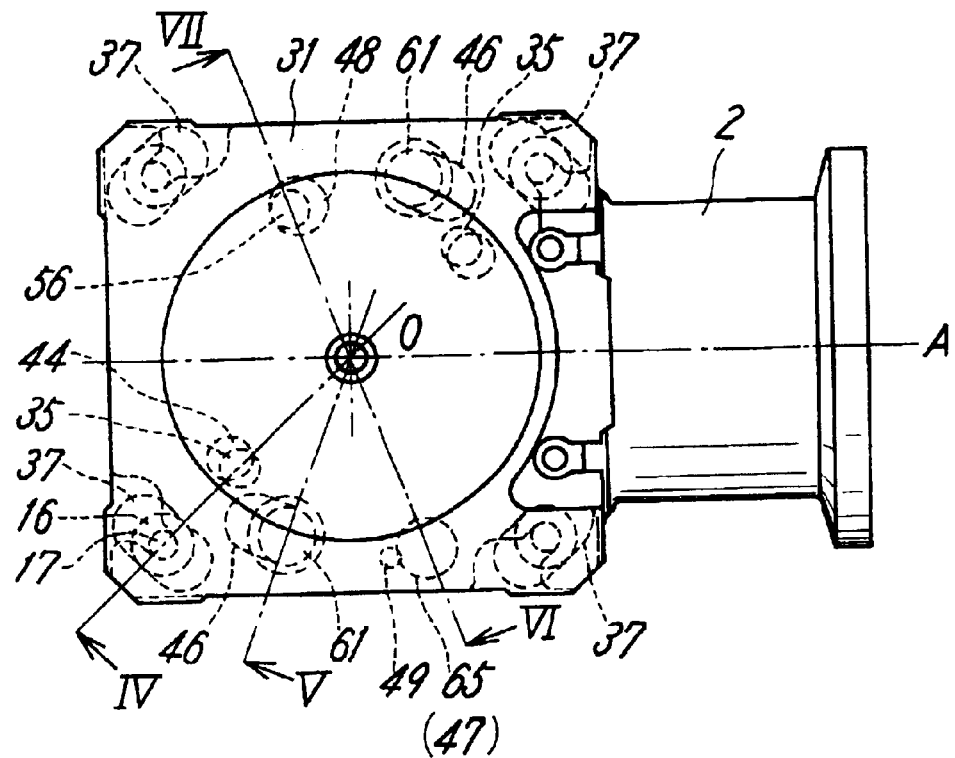
FIG. 3 is a plan view of the maintenance-easy two-port valve.
Figure 4:
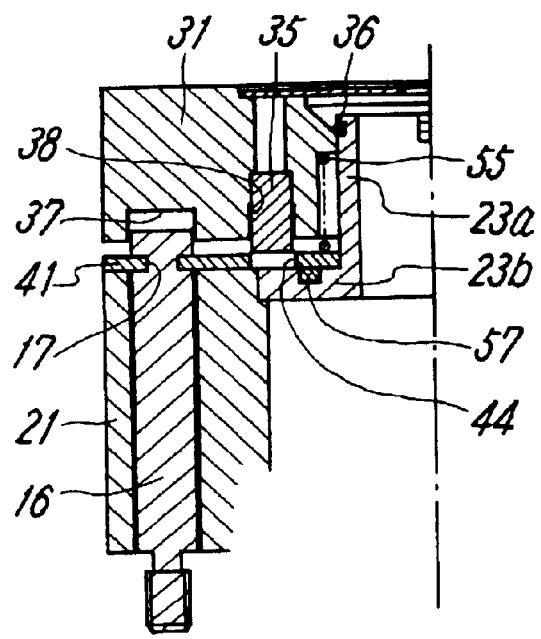
FIG. 4 is a cross-sectional view taken along line IV-O of FIG. 3.

As indicated by an ellipse denoted by a broken line in FIG. 3, the handle 31 has four elliptic grooves 37 provided on the lower surface thereof so that the upper end of the shaft 16 is fitted into the grooves 37 in a relatively displaceable manner. In addition, the position at which the end wall on the longitudinal one side of the elliptic groove 37 is struck on the upper end of each shaft 16 is designed to coincide with the above-stated push-down position of the handle 31, the position at which the other end wall of the elliptic groove 37 is struck on the upper end of each shaft 16 is designed to coincide with the position at which the engagement groove 43 of the plate 41 is disengaged from the retaining groove 17 of each shaft 16 when the handle 31 is rotated around an axis.

As can be seen, the position at which the end wall of the elliptic groove 37 is struck on the upper end of each shaft 16 to stop the handle 31 is set at the push-down position of the handle 31 or the position at which the engagement groove 43 of the plate 41 is disengaged from the retaining groove 17 of each shaft 16 when the handle 31 is rotated, thereby making it possible to facilitate positioning either the handle 31 or the plate 41.

Figure 8:
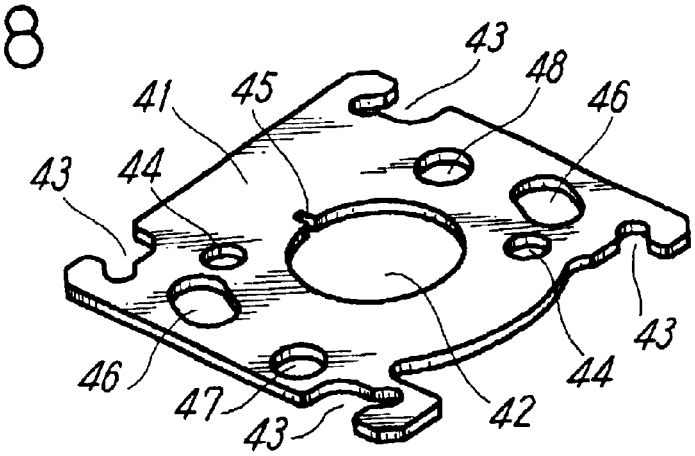
FIG. 8 is a perspective view of a plate employed in the maintenance-easy two-port valve.
Figure 9:
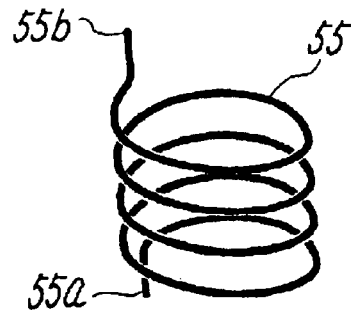
FIG. 9 is a perspective view of a coil spring.
Figure 13:
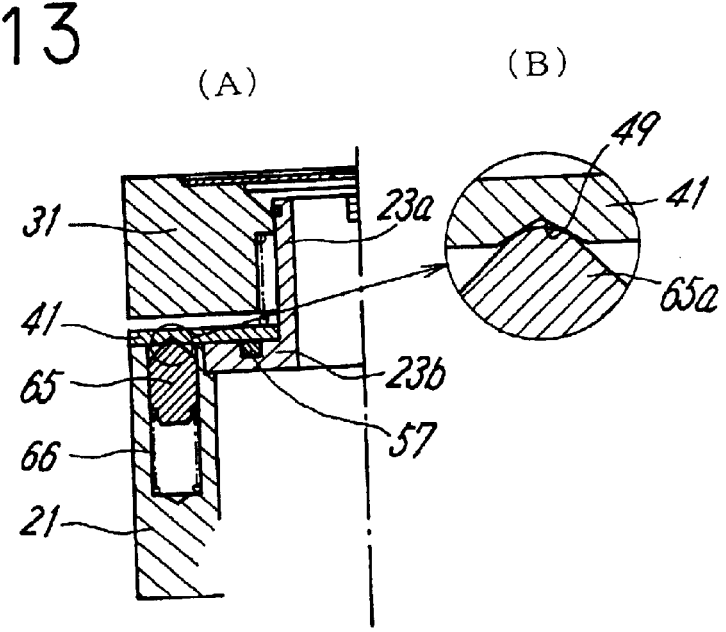
FIG. 13(A) is a cross-sectional view taken along ling XIII-O of FIG. 11.
FIG. 13(B) is a partially enlarged view of FIG. 13(A).

As shown in FIG. 8, the plate 41 includes one through hole 42, four engagement grooves 43 and two engagement holes 44 as stated above. The plate 41 also includes one lock hole 47 into which a lock pin 65 to be described later is inserted, two elliptic holes 46 into which the heads of a hexagon socket head cap screw 61 are inserted, and one circular hole 48 into which a counter rotation prevention protrusion pin 56 is relatively, rotatably inserted. Further, as shown in FIG. 13, a small lock recess 49 into which only the tip of the tip end portion 65a of the lock pin 65 is inserted, is provided in the vicinity of the lock hole 47 on the lower surface of the plate 41.

Figure 5:
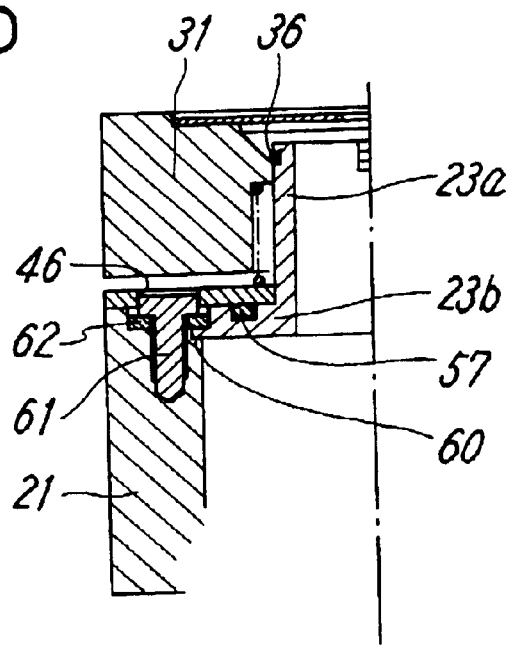
FIG. 5 is a cross-sectional view taken along line V-O of FIG. 3.

As shown in FIG. 5, the collar 23 is detachably attached to the upper end portion of the bonnet 21 by mounting the large-diameter flange section 23b on the stepped portion 60 of the upper end portion of the bonnet 21 and fixing the large-diameter flange section 23b to the stepped portion 60 through a spacer 62 by the hexagon socket head cap screw 61 screwed with the upper portion of the bonnet 21.

Further, as shown in FIG. 5, the head of the hexagon socket head cap screw 61 is inserted into each elliptic hole 46 of the plate 41, the plate 41 is rotated about the axis, the rotation position at which one end wall of the elliptic hole 46 is struck on the head of the bolt 61 coincides with the position at which the engagement groove 43 of the plate 41 is engaged with the retaining groove 17 of each shaft 16, and the rotation position at which the other end wall of the elliptic hole 46 is struck on the head of the bolt 61 coincides with the position at which the engagement groove 43 is disengaged from the engagement groove 17 of each shaft 16.

The plate 41 is mounted on the upper surface of the large-diameter flange section 23b, and the O ring 57 is provided between the large-diameter section 23b and the plate 41.

Figure 6:
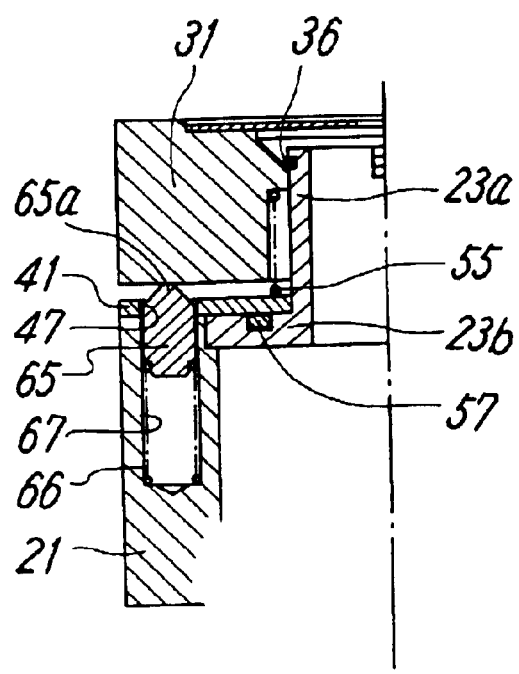
FIG. 6 is a cross-sectional view taken along line VI-O of FIG. 3.

As shown in FIG. 6, the bonnet 21 includes the lock pin 65 biased by a spring 66 such that a tapered tip end portion 65a protruding from the upper end portion of the bonnet 21, and a lock pin hole 67 into which the lock pin 65 is contained. At the rotation position at which the engagement groove 43 of the plate 41 is engaged with the retaining groove 17 of each shaft 16 (i.e., the position at which the bonnet assembly 3 is fixed to the valve body 2), the lock pin 65 is inserted into the lock hole 47 of the plate 41, whereby the plate 41 is locked to the bonnet 21.

In addition, at the rotation position at which the engagement groove 43 of the plate 41 is disengaged from the retaining groove 17 of each shaft 16, the lock pin 65 is detached from the lock hole 47 and the tip end portion 65a thereof is inserted into the lock recess 49, thereby locking the plate 41 to the bonnet 21.

Figure 7:
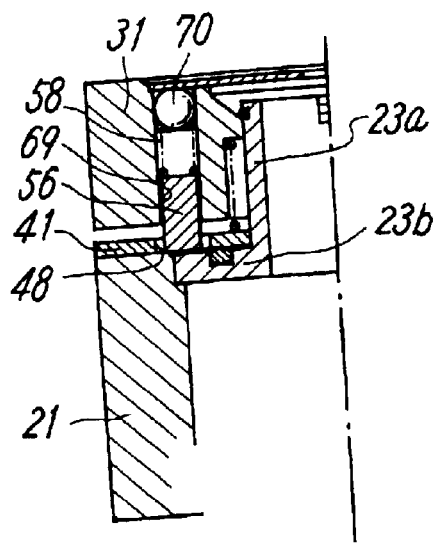
FIG. 7 is a cross-sectional view taken along line VII-O of FIG. 3.

As shown in FIG. 7, the handle 31 includes the protrusion pin 56 having a tip end urged to protrude downward from the lower surface of the handle 31. This protrusion pin 56 is slidably contained in the through hole 69 provided in the handle 31, a steel ball 70 is press-fitted into the upper end portion of the through hole 69, and a spring 58 which urges the protrusion pin 56 is provided between the steel ball 70 and the protrusion pin 56.

The protrusion pin 56 is inserted into the circular hole 48 of the plate 41 larger in diameter than the pin 56 to be relatively displaceable, and prevents the handle 31 from being rotated in the counter direction (i.e., in the counter direction toward the rotation direction toward the push-down position) at the position at which the bonnet 21 is fixed to the valve body 2 (in a state shown in FIG. 3).

An operation for detaching the bonnet assembly 3 from the valve body 2 of the maintenance-easy two-port valve 1 will be described with reference to FIGS. 3 and 10 to 12.

In the state shown in FIG. 3, the bonnet assembly 3 is fixed to the valve body 2, in which state the plate 41 is at the rotation position at which the engagement groove 43 is engaged with the retaining groove 17 of each shaft 16 and the lock pin 65 is inserted into the lock hole 47 of the plate 41.

In this state shown in FIG. 3, the position of the engagement pin 35 of the handle 31 is deviated from the position of the engagement hole 44 of the plate 41. Due to this, even if the handle 31 is to be pushed down, the engagement pins 35 are abutted on the upper surface of the plate 41 and the handle 41 cannot be pushed down.

Figure 10:
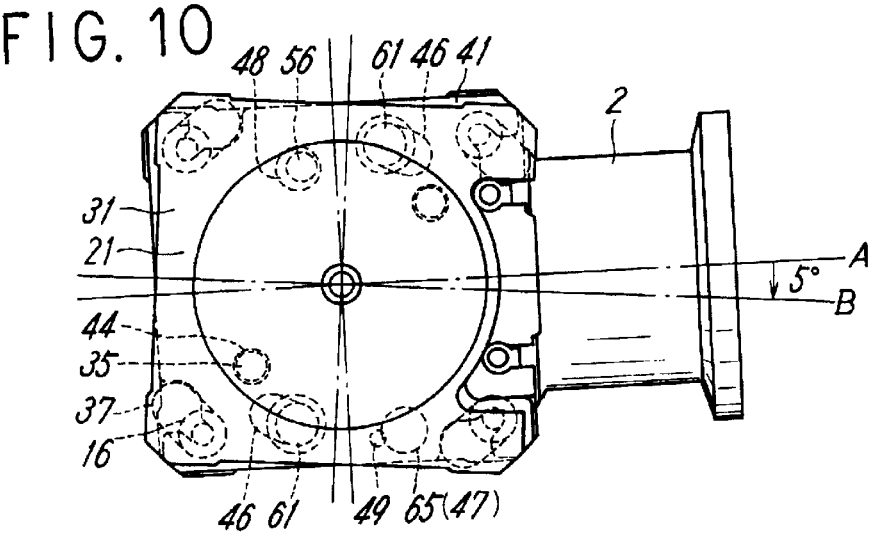
FIG. 10 shows an operation state if the bonnet assembly is detached from the valve body of the maintenance-easy two-port valve.

If the fixed state shown in FIG. 3 is a reference position A and the handle 31 is rotated right by 5° to change this position to a state shown in FIG. 10, then the handle 31 reaches the push-down position B at which the position of each engagement pin 35 coincides with the position of the engagement hole 44 of the plate 41. It is, therefore, possible to push down the handle 31 by fitting the engagement pin 35 into the engagement hole 44.

If the handle 31 is rotated left while being pushed down, the plate 41, which is engaged with the handle 31 by the engagement pins 35, is rotated together with the handle 31. If the plate 41 is rotated, the tapered portion (see FIG. 6) of the tip end portion 65a of the lock pin 65 is pressed by the hole wall of the lock hole 47 of the plate 41 and the lock pin 65 is pressed down against the urging force of the spring 66. As a result, the plate 41 overpasses the tip end portion 65a of the lock pin 65 and is rotated, thereby releasing lock by the engagement of the lock pin 65 with the lock hole 47.

Figure 11:
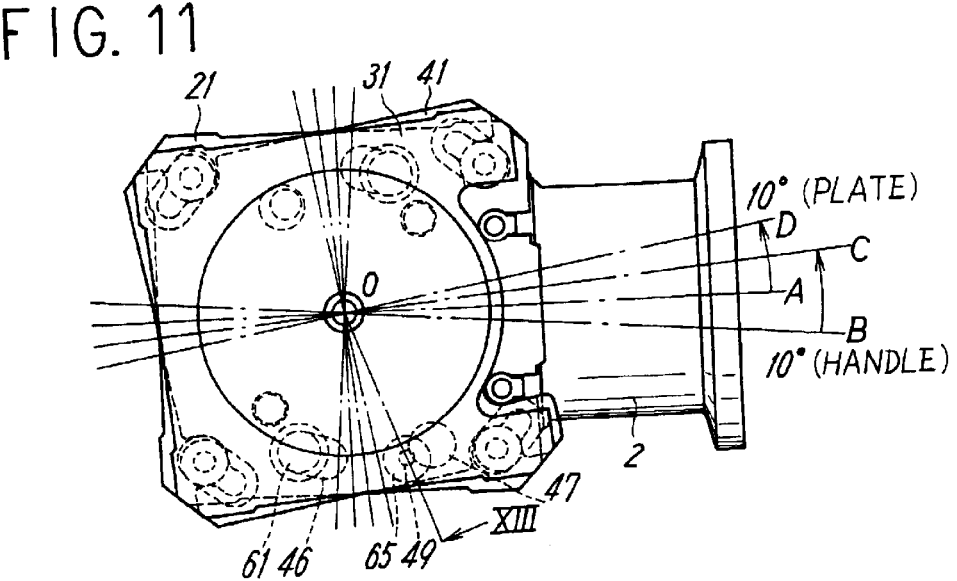
FIG. 11 shows another operation state.

In this way, if the handle 31 is rotated left by 10° from a position B shown in FIG. 10 (rotated left by 5° from the reference position), then the handle 31 is displaced to a position C, the plate 41 is rotated left by 10° together with the handle 31 (rotated left by 10° from the reference position A) and reaches a position D at which the engagement groove 43 is disengaged from the retaining groove 17 of the shaft 16 as shown in FIG. 11. It is, therefore, possible to detach the bonnet assembly 3 from the valve body 2.

That is, the handle 31 is connected to the bonnet 21 through the collar 23. Due to this, if the handle 31 is lifted in the state shown in FIG. 11, the bonnet 21 and the parts connected to the bonnet 21 can be pulled out from the shafts 16.

Now, the rotation position at which the handle 31 is rotated right by 5° to the position B and rotated left by 10° to the position C is specified by the position at which the both end walls of the elliptic groove 37 of the handle 31 are abutted on the upper end of each shaft 16.

Further, if the handle 31 is lifted in a state shown in FIG. 11, i.e., in a state in which the handle is at the position C and the plate 41 is at the position D, the plate 41 is pressed and moved by the force of the coil spring 55 in a direction away from the handle 31. Due to this, the engagement pin 35 on the lower surface of the handle 31 comes off from the engagement hole 44 of the plate 41, the plate 41 is rotated right by 5° relative to the handle 31 by the urging force in the rotation direction accumulated in the coil spring 55 (i.e., the handle 31 is rotated left by 5° relative to the plate 41), and the plate 41 returns to the original relative rotation position with an angle difference of 0.

Figure 12:
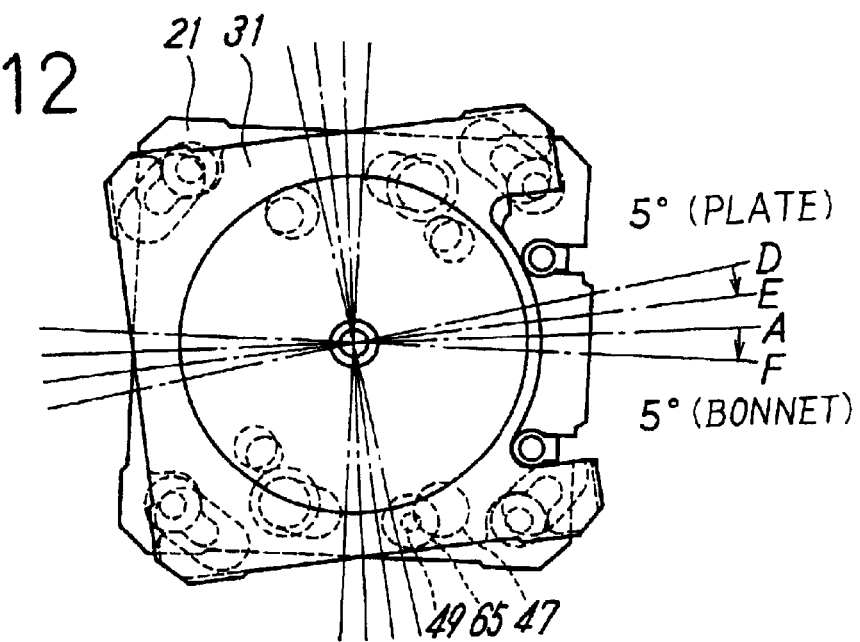
FIG. 12 shows another operation state.

Furthermore, the position D at which the plate 41 has been rotated left by 10° from the reference position A is also a position at which the tip end portion 65a of the lock pin 65 is engaged with the lock recess 49 on the lower face of the plate 41 and the plate 41 is locked to the bonnet 21. Due to this, if the handle 31 is lifted in the state shown in FIG. 11 to detach the bonnet assembly 3, the bonnet 21 together with the plate 41 is also rotated right by 5° relative to the handle 31. As a result, as shown in FIG. 12, the plate 41 and handle 31 are detached in a state E in which they have been rotated left by 5° from the reference position A and the bonnet 21 is detached in a state F in which has been rotated right by 5° from the reference position A.

An operation for attaching the bonnet assembly 3 to the valve body 2 of the maintenance-easy two port valve 1 will be described with reference to FIGS. 14 to 17.

Figure 14:
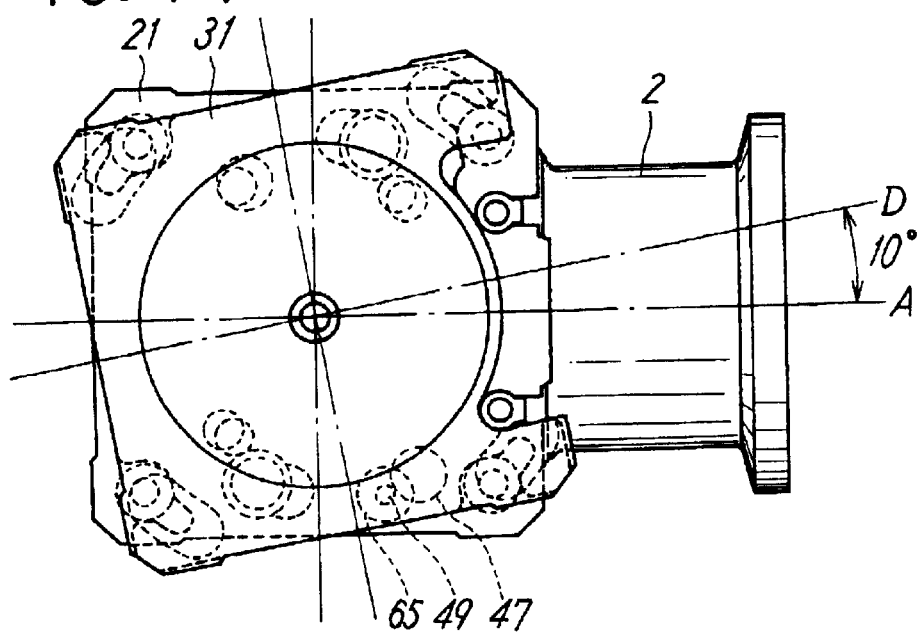
FIG. 14 shows an operation state if the bonnet assembly is attached to the valve body of the maintenance-easy two-port valve.

FIG. 14 shows a state in which the bonnet assembly 3 is inserted into the valve body 2. In this state, the plate 41 is at the position D rotated left by 10° from the reference position A as in the case of detaching the bonnet assembly 3, the handle 31 is at the position D rotated left by 10° from the reference position A as the same the plate 41 and the bonnet 21 is at the reference position A.

Figure 15:
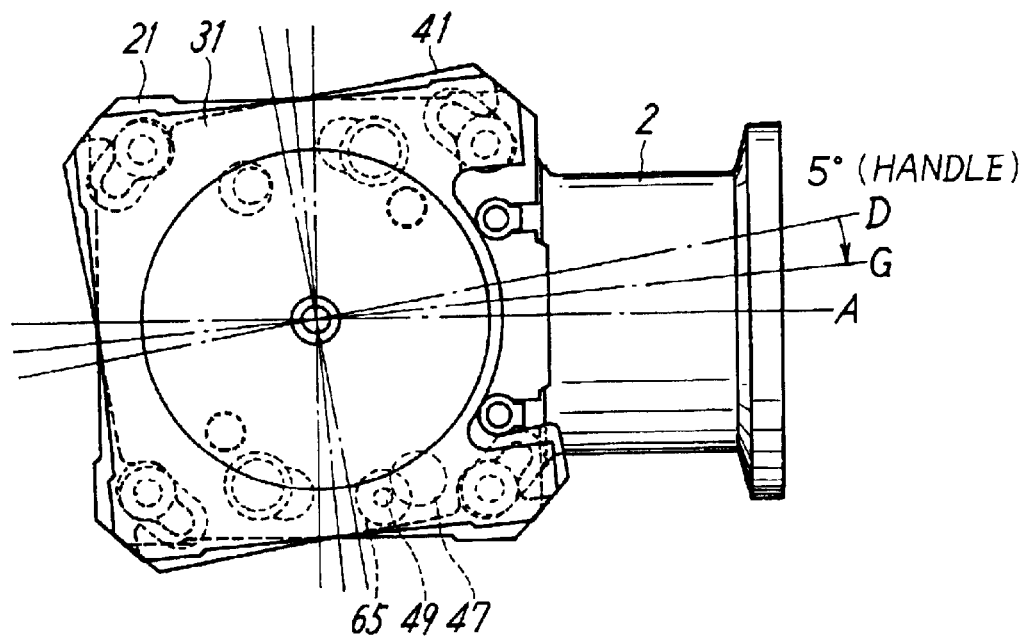
FIG. 15 shows another operation state.

If the handle 31 is rotated right by 5° (rotated left by 5° from the reference position) in this state, the handle 31 reaches a push-down position G as shown in FIG. 15. Therefore, by pushing down the handle 31, the engagement pin 35 can be engaged with the engagement hole 44.

Figure 16:
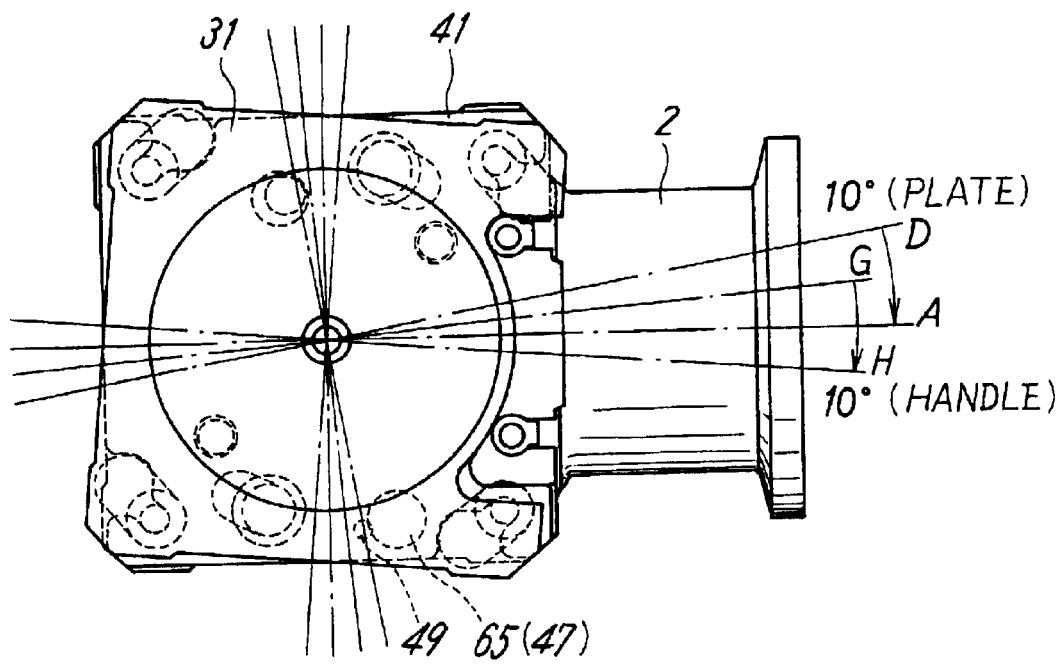
FIG. 16 shows another operation state.

If the handle 31 is further rotated right by 10° (rotated right by 5° from the reference position) in a state in which the handle 31 is pushed down, then the handle 31 reaches a position H and the plate 41 is rotated right by 10° together with the handle 31 to return to the reference position A as shown in FIG. 16. Due to this, the engagement groove 43 of the plate 41 is engaged with the retaining groove 17 of each shaft 16, the bonnet assembly 3 is fixed to the valve body 2 and the lock pin 65 is fitted into the lock hole 47 of the plate 41 to thereby lock the plate 41 to the bonnet 21.

Figure 17:
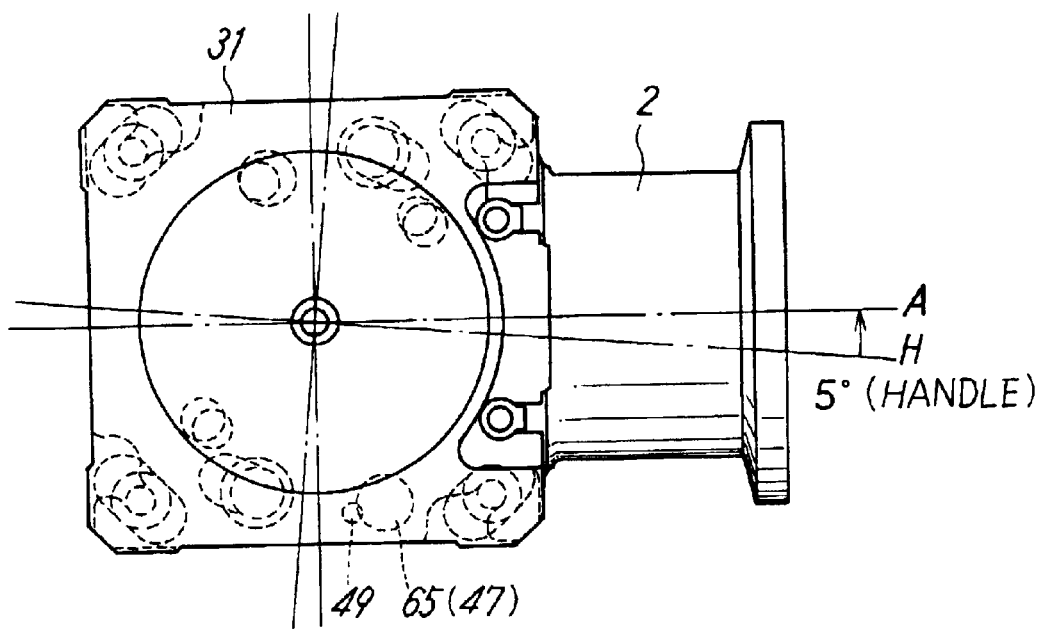
FIG. 17 shows another operation state.

If the handle 31 is rotated left by 5° in this state, the handle 31 returns to the reference position A as shown in FIG. 17 and the state of the handle 31 becomes equal to the fixed state shown in FIG. 3.

Since the maintenance-easy two-port valve 1 is constituted so that the bonnet 21 can be attached to or detached from the valve body 2 only by pushing down, rotating and lifting the handle 31, the valve body and the bonnet can be easily disassembled and assembled.

Further, the maintenance-easy two-port valve 1 is constituted so that such parts as the handle 31, the plate 41, the collar 23 and the bellows 26 are connected to the bonnet 21 and these parts can be detached together with the bonnet 21 if the bonnet 21 is detached from the valve body 2. Therefore, disassembly and assembly are easy and the maintenance of the two-port valve 1 can be easily done.

Moreover, since the maintenance-easy two-port valve 1 is constituted so that the handle 31 is engaged with the plate 41 by rotating and pushing down the handle 31 to the push-down position, the plate 41 cannot be rotated only by rotating the handle 31.

Due to this, even if the handle 31 is erroneously rotated, the state of fixing the bonnet 21 is not released. Despite the structure of easy disassembly, the bonnet 21 is not detached from the valve body 2 by an erroneous operation and the maintenance-easy two-port valve 2 ensures safety.

As described so far in detail, according to the present invention, it is possible to provide a maintenance-easy two-port valve capable of easily assembling and disassembling a valve body and a bonnet and preventing the bonnet from being detached from the valve body by an erroneous operation.

What is claimed is:

1. A maintenance-easy two-port valve comprising: a valve body including two ports, a valve seat in a flow path connecting the two ports to each other, and an open end; a valve member opening and closing said valve; a bonnet airtight connected to the open end of said valve body, and containing a cylinder system driving said valve member; and a connection mechanism for detachably connecting the bonnet to said valve body, characterized in that said connection mechanism comprises: a plurality of shafts attached to said valve body, penetrating said bonnet in an axial direction, and each having a tip end protruding outward from an outer end face of the bonnet; a handle attached onto the outer end face of said bonnet to be rotatable around an axis and displaceable in the axial direction, and having one or a plurality of engagement pins on a surface facing the outer end face of said bonnet; a plate provided between said bonnet and said handle to be rotatable around the axis, and including a plurality of engagement grooves engaged with or disengaged from upper ends of said shafts, respectively, and one or a plurality of engagement holes into which or from which said one or plurality of engagement pins are fitted or disengaged, respectively; and a spring disposed between said handle and said plate, and urging the handle and the plate in a direction in which the handle and the plate are away from each other and a direction in which the handle and the plate are rotated relative to each other.

2. A two port connection port according to claim 1, characterized in that said bonnet includes a lock pin engaged with and disengaged from said plate, the lock pin is stopped at the plate to lock the plate to said bonnet if said plate is at a position at which the plate is engaged with said shafts and a position at which the plate is disengaged from said shafts, and the lock pin is detached from the plate to release locking of the plate to the bonnet while said plate is rotated from the position at which the plate is engaged with said shafts to the position at which the plate is disengaged from the shafts.

3. A two port connection port according to claim 1 or 2, characterized in that said handle includes a plurality of elliptic grooves, the upper ends of said shafts being displaceably fitted into the elliptic grooves, respectively, a push-down position of said handle is specified when an end wall on one longitudinal side of each of the elliptic grooves is abutted on each of said shafts, and a position at which the shafts are disengaged from the engagement grooves of said plate, respectively, is specified when an end wall on the other side of each of the elliptic grooves is abutted on each of said shafts, and said plate includes one or a plurality of elliptic holes, a bolt fixed to said bonnet being displaceably fitted into each of the elliptic holes, a position at which said shafts are engaged with the engagement grooves of said plate, respectively is specified when an end wall on one longitudinal side of each of the elliptic holes is abutted on said bolt, and a position at which the shafts are disengaged from the engagement grooves of said plate, respectively is specified when an end wall on the other side of each of the elliptic holes is abutted on said bolt.

4. A two port connection port according to claim 1 or 2, characterized in that said cylinder system includes a piston actuated by a function of fluid pressure; and a valve rod penetrating said bonnet to extend into said valve body, and connecting said piston to said valve member, and a return spring urging the valve member in a valve opening direction and a bellows surrounding said valve rod and the return spring are provided between said bonnet and said valve member.

5. A two port connection port according to claim 1 or 2, characterized in that a counter rotation prevention pin is provided at said handle, a hole, into which the counter rotation prevention pin is displaceable fitted, is provided in said plate, and said counter rotation prevention pin is constituted to be stopped in said hole and to prevent said handle from being rotated in a counter direction when said bonnet is connected to said valve body.

\* \* \* \* \*